(12) United States Patent
Edagawa et al.

(10) Patent No.: US 6,515,793 B2
(45) Date of Patent: Feb. 4, 2003

(54) OPTICAL WAVEFORM SHAPER

(75) Inventors: Noboru Edagawa, Kamifukuoka (JP); Masatoshi Suzuki, Kamifukuoka (JP)

(73) Assignees: DDI Corporation, Tokyo (JP); KDD Submarine Cable Systems, Inc., Tokyo (JP)

( * ) Notice: Subject to any disclaimer, the term of this patent is extended or adjusted under 35 U.S.C. 154(b) by 95 days.

(21) Appl. No.: 09/752,132

(22) Filed: Dec. 26, 2000

(65) Prior Publication Data

US 2001/0005276 A1 Jun. 28, 2001

(30) Foreign Application Priority Data

Dec. 27, 1999 (JP) .............................. 11-369022

(51) Int. Cl.[7] .............................................. G02F 2/00
(52) U.S. Cl. ..................................................... 359/326
(58) Field of Search ................................ 359/326–332, 359/333, 334

(56) References Cited

U.S. PATENT DOCUMENTS

| | | | |
|---|---|---|---|
| 5,264,960 A | * 11/1993 | Glance | 359/344 |
| 5,446,573 A | 8/1995 | Lomashevitch et al. | 359/158 |
| 5,450,229 A | * 9/1995 | Wiesenfeld | 359/238 |
| 5,513,030 A | 4/1996 | Epworth | 359/187 |
| 5,594,583 A | 1/1997 | Devaux | 359/184 |
| 5,721,637 A | * 2/1998 | Simon et al. | 359/344 |
| 5,798,852 A | 8/1998 | Billes et al. | 359/158 |
| 5,828,478 A | 10/1998 | Thomine et al. | 359/181 |
| 5,959,764 A | 9/1999 | Edagawa et al. | 359/326 |
| 6,069,732 A | * 5/2000 | Koch et al. | 359/344 |
| 6,335,819 B1 | * 1/2002 | Cho et al. | 359/333 |

FOREIGN PATENT DOCUMENTS

| | | |
|---|---|---|
| JP | 8-160367 | 6/1996 |
| JP | 9-244073 | 9/1997 |
| JP | 9-244074 | 9/1997 |
| JP | 9-244075 | 9/1997 |
| JP | 10-213821 | 8/1998 |

OTHER PUBLICATIONS

A. Hirano, et al., "All–optical limiter circuit based on four–wave mixing in optical fibers," Electronics Letters, Jul. 1998, pp. 1410–1411, vol. 34, No. 14.

Y. Wang, ⌐Nonlinear Optical Limiter and Digital Optical Switch by Cascaded Nonlinear Couplers: Analysis,¬ Journal of Lightwave Technology, Feb. 1999, pp. 292–297, vol. 17, No. 2.

* cited by examiner

*Primary Examiner*—John D. Lee
(74) *Attorney, Agent, or Firm*—Christie, Parker & Hale, LLP

(57) ABSTRACT

An optical waveform shaper comprising a probe light source for generating probe light with a constant amplitude, a signal copier to which input signal light of a signal wavelength and the probe light output from the probe light source is applied and which copies the signal of the input signal light onto the probe light, and an extinction ratio improver for improving the extinction ratio of output light from the signal copier is described.

8 Claims, 10 Drawing Sheets

OPTICAL WAVEFORM SHAPER

CROSS-REFERENCE TO RELATED APPLICATION

This application claims priority of Japan patent Application No. 11(99)369022, filed on Dec. 27, 1999.

FIELD OF THE INVENTION

This invention relates to an optical waveform shaper, and more particularly relates to an optical waveform shaper capable of controlling a constant peak value of a high-speed (e.g. a speed over 10 Gbps) optical pulse.

BACKGROUND OF THE INVENTION

In optical fiber communication, signals are transmitted according to whether an optical pulse exists. A peak of each optical pulse that is constant at the input stage becomes irregular due to various reasons. This phenomenon is called a pattern effect. Examples of such waveforms are shown in FIGS. 10(*a*) and 10(*b*). FIG. 10(*a*) shows an optical pulse train in which pulse peak values are constant. FIG. 10(*b*) shows an optical pulse train in which pulse peak values are irregular due to the pattern effect. Such a pattern effect results from the synergistic action of a self phase modulation effect, an interaction between adjacent optical pulses, a cross modulation effect between adjacent wavelengths and chromatic dispersion of an optical transmission fiber. Also, the pattern effect is apt to occur when the following components are used; a narrow band optical filter in which the transmission center wavelength is out of position or an optical modulator in which the modulation band is not extended enough to cover the low band. The pattern effect causes the deterioration of an eye aperture and also deteriorates a bit error rate.

Such pattern effects can be removed by applying an optical limiter for regulating a peak part of each optical pulse to be constant. The following structures are known as such types of optical limiters.

Japanese Laid-Open Patent Publication No. Heisei 10(1998)-213821 describes a waveguide type optical limiter that obtains an optical limiting function by utilizing such characteristics that, in two parallel waveguides formed on the same substrate, the coupling coefficient between the two waveguides varies according to the optical intensity applied to either one of the waveguides.

Japanese Laid-Open Patent Publication No. Heisei 9(1997)-244075 describes a configuration for obtaining the optical limiting function by appropriately selecting an absorption factor of an optical absorber. Japanese Laid-Open Patent Publication No. Heisei 9(1997)-244074 describes a configuration in which an optical amplifier is disposed before or behind the optical limiter element mentioned in the above Japanese Laid-Open Patent Publication No. Heisei 9(1997)-244075. Japanese Laid-Open Patent Publication No. Heisei 9(1997)-244073 describes a configuration in which the optical limiter mentioned in the above Japanese Laid-Open Patent Publication No. Heisei 9(1997)-244075 and the optical limiter mentioned in the above Japanese Laid-Open Patent Publication No. Heisei 9(1997)-244074 are multistage-connected.

Japanese Laid-Open Patent Publication No. Heisei 8(1996)-160367 describes a configuration in which a saturable absorber is disposed on one branched optical line in a Mach-Zehnder interferometer system which is set so that light are combined in opposite phase at a combining part. In this configuration, when intensive light enters the Mach-Zehnder interferometer system, the transmission rate of the saturable absorber increases and consequently the amount to be combined in opposite phase also increases. As a result, the power level of the output light can be limited.

U.S. Pat. No. 5,446,573 describes an all-optical waveform regenerator utilizing a nonlinear ring resonator including a light source, a multi-sectional laser for generating a clock frequency and a plurality of phase modulators.

U.S. Pat. No. 5,798,852 describes a configuration of a device for shaping a waveform of an optical signal by inputting into an all-optical gate, simultaneous with an input optical signal, the optical pulse train modulated by the same frequency with a clock frequency of the input optical signal.

U.S. Pat. Nos. 5,594,583 and 5,513,030 describe a waveform shaper for modulating the intensity of an input optical signal by applying into an electroabsorption optical modulator an electric signal modulated by the same frequency with a clock frequency of the input optical signal.

U.S. Pat. No. 5,828,478 describes a configuration for shaping a waveform of an optical signal by utilizing an intensity modulator and a phase modulator disposed in a transmission line and a nonlinear optical effect accumulated in long haul transmission. In this configuration, the transmission system as a whole has the waveform shaping function, and in that respect this configuration differs a lot from the others.

In addition to the above-mentioned patents, there are the following papers. A. Hirano, et al., "All-optical limiter circuit based on four-wave mixing in optical fibers," Electron Lett., 34, pp. 1410–1411, 1998 describes an optical limiter using four-wave mixing in optical fibers, and Y. Wang, J., "Nonlinear Optical Limiter and Digital Optical Switch by Cascaded Nonlinear Couplers: Analysis," Lightwave Technol., 17, pp. 292–297, 1999. 12. 19. describes an optical limiter using cascade connection of nonlinear couplers.

However, the aforesaid configurations have problems. That is, the configurations described in the Japanese Laid-Open Patent Publication No. Heisei 10(1998)-213821 and the paper by Wang, J. are inefficient since it is necessary to greatly change the propagation constant of a waveguide by the configurations need high input power. Each configuration described in the above-mentioned Japanese Laid-Open Patent Publication Nos. Heisei 9(1997)-244073, Heisei 9(1997)-244074 and Heisei 9(1997)-244075 requires a complicated optical system in order to remove the polarization dependency. The configuration described in the Japanese Laid-Open Patent Publication No. Heisei 8(1996)-160367 is inconvenient to use since its operation wavelength range is limited due to the wavelength dependency of the interferometer system.

The configurations described in the U.S. Pat. Nos. 5,446,573 and 5,798,852 are not only complicated but also require a lot of optical components. In the configurations described in the U.S. Pat. Nos. 5,594,583 and 5,513,030, the optical modulator merely modulates the intensity of the signal light uniformly, and so the limiting function can be hardly expected. The configuration described in the U.S. Pat. No. 5,828,478 requires being large-scale since the waveform shaping is performed by using the characteristics of the whole transmission system.

The configuration described in the paper by A. Hirano is inefficient since the four-wave mixing is utilized. Also, its configuration becomes complicated because it is necessary to control the polarization state of the light to be used.

As stated above, there is no such optical limiter in the conventional optical limiters or waveform shapers that can efficiently control pulse peak values of an optical pulse train to be constant and still has a simple configuration. Also, the high-speed responsibility is insufficient in the conventional art.

SUMMARY OF THE INVENTION

It is therefore an object of the present invention to provide an optical waveform shaper of a simple configuration for regulating a peak value of an optical pulse to be constant.

Another object of the invention is to provide an optical waveform shaper for controlling a peak value of an optical pulse, as fast as 10 Gbps or more, to be constant.

An optical waveform shaper according to the invention is composed of a probe light source for generating a probe light having constant amplitude, a signal copier being applied with input signal light of a wavelength $\lambda s$ and the probe light output from the probe light source and for copying the signal of the input signal light onto the probe light, and an extinction ratio improver for improving the extinction ratio of output light from the signal copier. The signal copier copies the signal of the input signal light onto the probe light having the constant amplitude, and the extinction ratio improver improves the extinction ratio of the signal. This configuration is sufficient for the signal copier to shape the waveform of the probe light to the extent capable while still maintaining the signal of the input signal light, and so the amplitude of the probe light after the waveform shaping still keeps the constant value. The signal quality is also improved because of the improvement of the extinction ratio by the extinction ratio improver, and so an optical waveform shaper having satisfactory characteristics as a whole can be realized.

The signal copier is composed of, for instance, a waveform copier for copying a signal waveform of the input signal light onto the probe light with cross saturable absorbing characteristics. The waveform copier is composed of, for instance, an electroabsorption optical modulator. With this configuration, high-speed input signal light as fast as 10 Gbps or more can be realized.

The extinction ratio improver is preferably composed of a saturable absorber. The saturable absorber is composed of, for example, an electroabsorption optical modulator being applied with a predetermined DC bias. With this configuration, an extinction ratio of high-speed signal light as fast as 10 Gbps or more can also be realized.

When the optical waveform shaper has an optical circulator for introducing the input signal light into the signal copier as well as applying the probe light from the signal copier to the extinction ratio improver, the configuration becomes even simpler.

Preferably, the probe light source is composed of a pulse light source for generating an optical pulse having the same frequency as a clock frequency of the input signal light. With this configuration, the waveform quality of the output light pulse is also improved.

The probe light source is further composed of a phase synchronizer for synchronizing the phase of the optical pulse from the pulse light source with the input signal light. The phase synchronizer is, for instance, a phase adjuster for adjusting the pulse phase of the pulse light source according to the output light of the extinction ratio improver. With this configuration, the signal of the input signal light is converted into the probe light without difficulty even if the input signal light has jitter more than a certain amount.

BRIEF DESCRIPTION OF THE DRAWINGS

The above and other objects, features and advantages of the present invention will be apparent from the following detailed description of the preferred embodiments of the invention in conjunction with the accompanying drawings, in which.

DESCRIPTION OF THE PREFERRED EMBODIMENT

Embodiments of the invention are explained below in detail with reference to the drawings.

Figure 1:
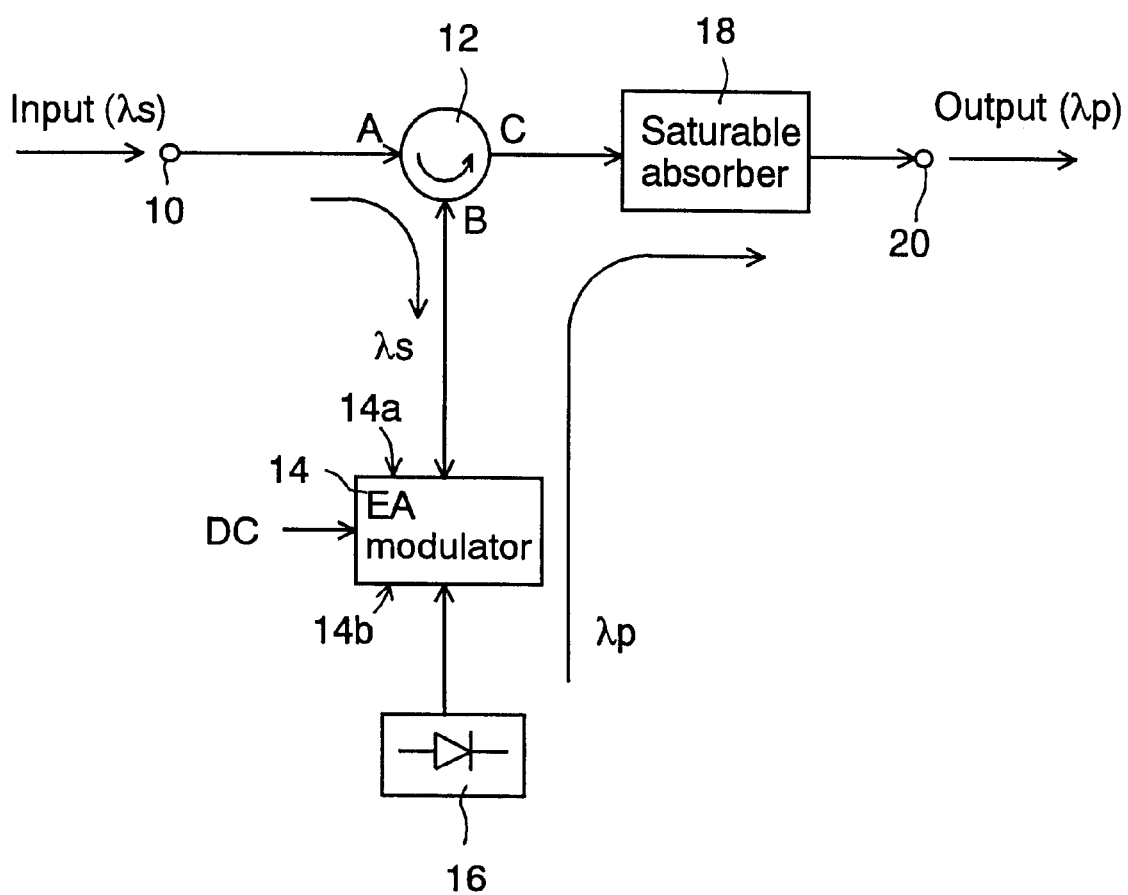
FIG. 1 shows a schematic block diagram of a first embodiment according to the invention.

FIG. 1 shows a schematic block diagram of a first embodiment according to the invention. The configuration and operation of the embodiment is explained below. Signal light that is composed of an optical pulse train, in which a peak value of each optical pulse is irregular, enters an optical input port 10 from, for example, an optical transmission line. Here, the wavelength of the signal light is designated $\lambda s$. The input light (wavelength $\lambda s$) of the optical input port 10 enters a port A of an optical circulator 12. The optical circulator 12 is an optical element having three ports, A, B and C, and outputs the input light of port A from port B and outputs input light of port B from port C.

The optical signal (wavelength $\lambda s$) which is output from B of the optical circulator 12 enters one facet 14a of an electroabsorption optical modulator 14. A laser light source 16 generates CW light (probe light) of a wavelength $\lambda p$ different from the wavelength $\lambda s$ of the optical signal. The output light from the laser light source 16 electroabsorption optical enters the other facet 14b of the modulator 14. The electroabsorption optical modulator 14 is applied with DC voltage of 2 V. When an electroabsorption optical modulator is applied with two lights having different wavelengths, the electroabsorption optical modulator shows cross saturable absorbing characteristics and copies a waveform of the light with one wavelength on the light with the other wavelength. This is the function of a wavelength converter and this function is described in detail, for example, in Japanese Laid-Open Patent Publication No. 10-78595 (or U.S. patent application Ser. No. 08/923,349). When the electroabsorption optical modulator is used as the wavelength converter, the DC voltage to be applied is as high as approximately 3 V since a sufficient extinction ratio is necessary. However, in this embodiment, such a high extinction ratio is not required at this stage and so the voltage to be applied to the electroabsorption optical modulator 14 is approximately 2 V, which is lower than the voltage applied when it functions as a wavelength converter.

The light of the wavelength $\lambda p$, which is output from the facet 14a of the electroabsorption optical modulator 14 toward port B of the optical circulator 12, has a pulse waveform similar to that of the signal light of the wavelength $\lambda s$. Since the DC voltage applied to the electroabsorption optical modulator 14 is low, the extinction ratio of the optical pulse of the wavelength $\lambda p$, which is output from the electroabsorption optical modulator 14, also is low. However, the obtained peak value of each optical pulse of the optical pulse train of the wavelength $\lambda p$ is constant according to the intensity level of the output light from the laser light source 16.

The optical pulse of the wavelength $\lambda p$ output from the electroabsorption optical modulator 14 enters port B of the optical circulator 12 and is applied to a saturable absorber 18 from port C of the optical circulator 12. The saturable absorber 18, as is generally known, is an element in which the transmission rate increases owing to the saturable absorption when the optical intensity of input light increases. That is, the transmission rate of the saturable absorber 18 is low at a low intensity part between the optical pulses and high at a part where the optical pulse exists. With this configuration, the extinction ratio is improved. The saturable absorber 18 is composed of, for example, an electroabsorption optical modulator applied with 2 V DC voltage.

The optical pulse train of the wavelength $\lambda p$ which is transmitted through the saturable absorber 18 has the form in which the amplitudes of the optical pulse train of the wavelength $\lambda s$, having entered the input port 10, are unified into a constant value, and it is applied to the following optical circuit from an optical output port 20 as the aimed output light.

Figure 2:
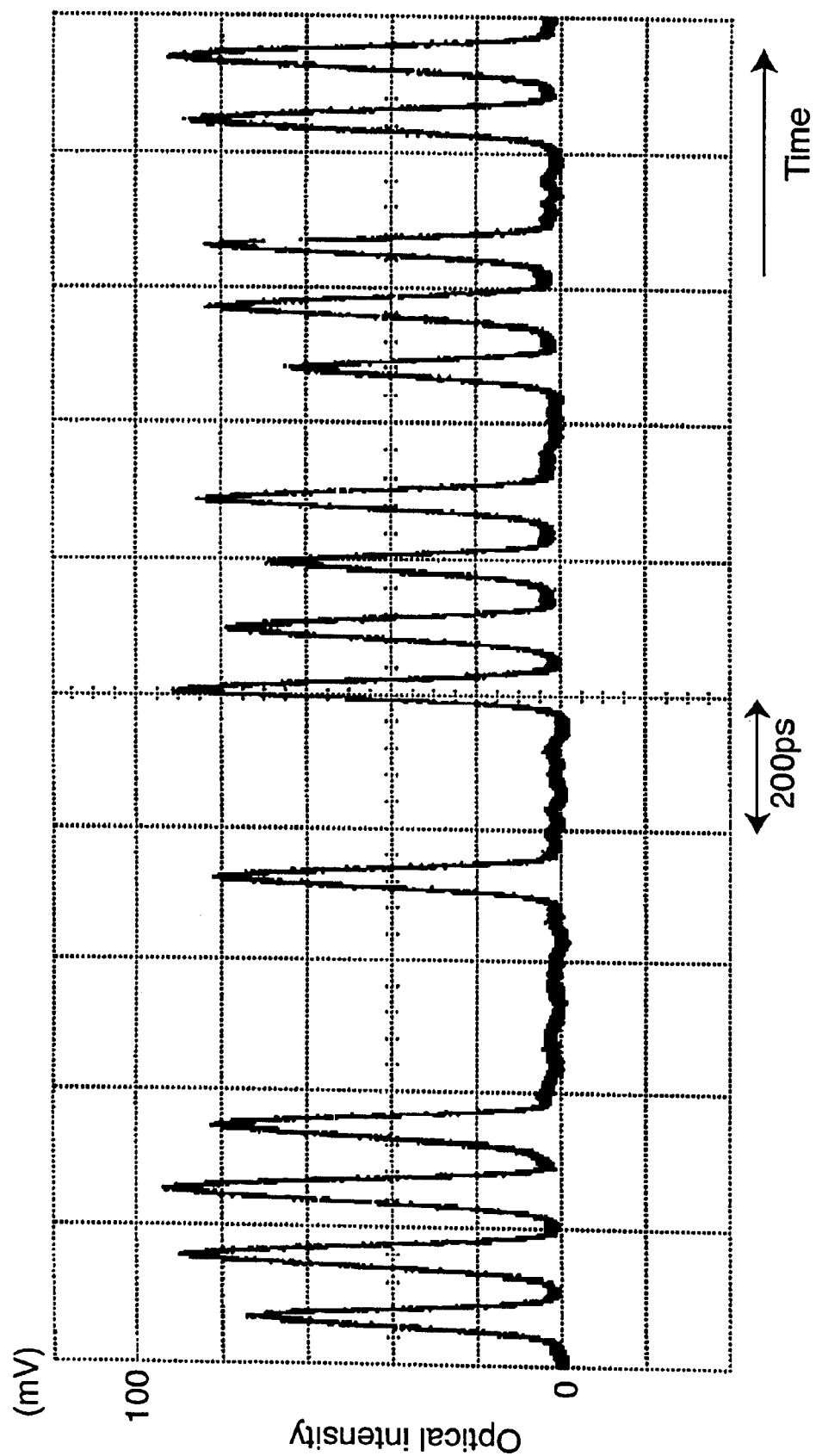
FIG. 2 shows a waveform example of input signal light of an optical input port 10.
Figure 3:
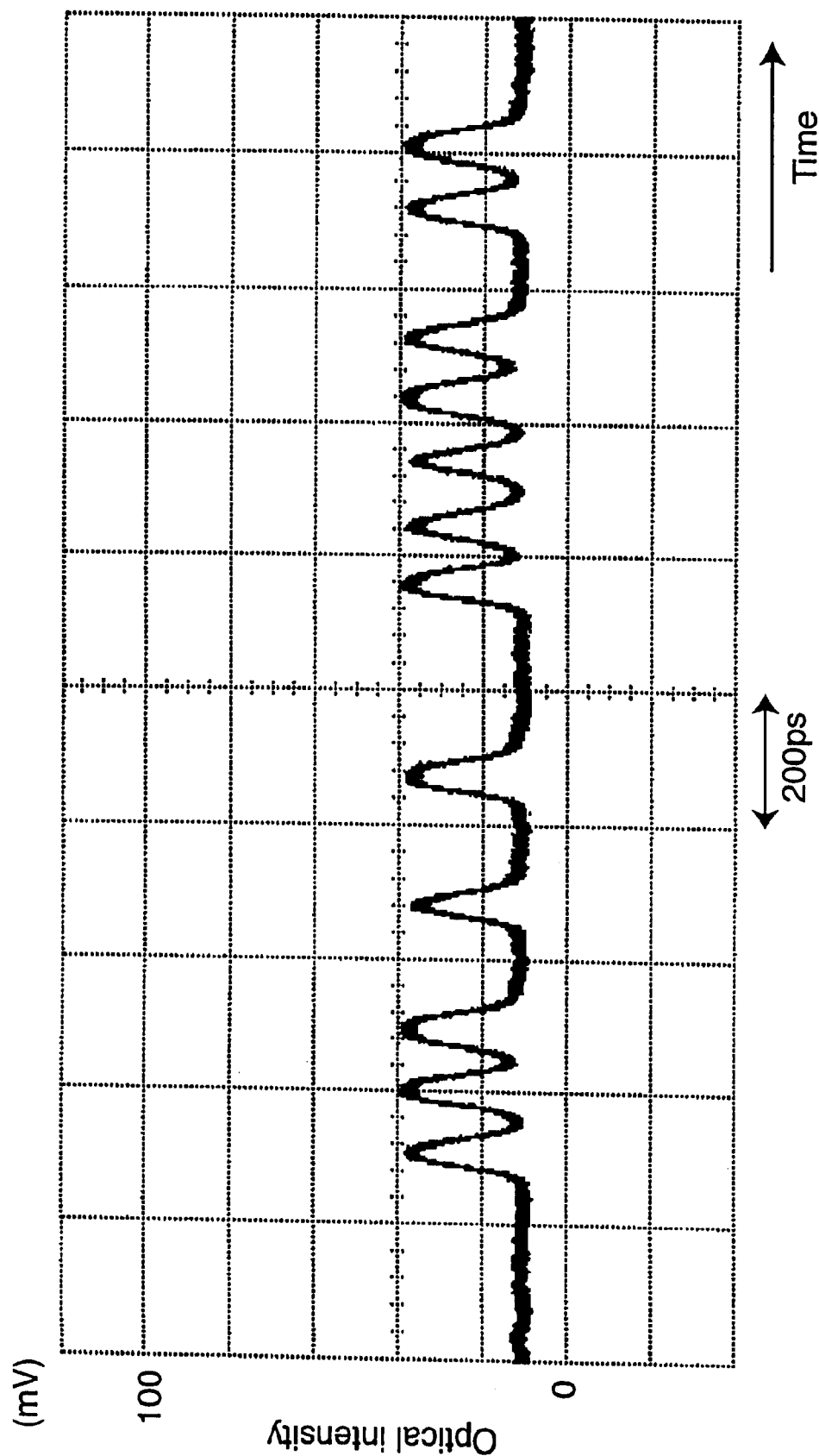
FIG. 3 shows an optical pulse waveform of wavelength-converted light by an electroabsorption optical modulator 14.
Figure 4:
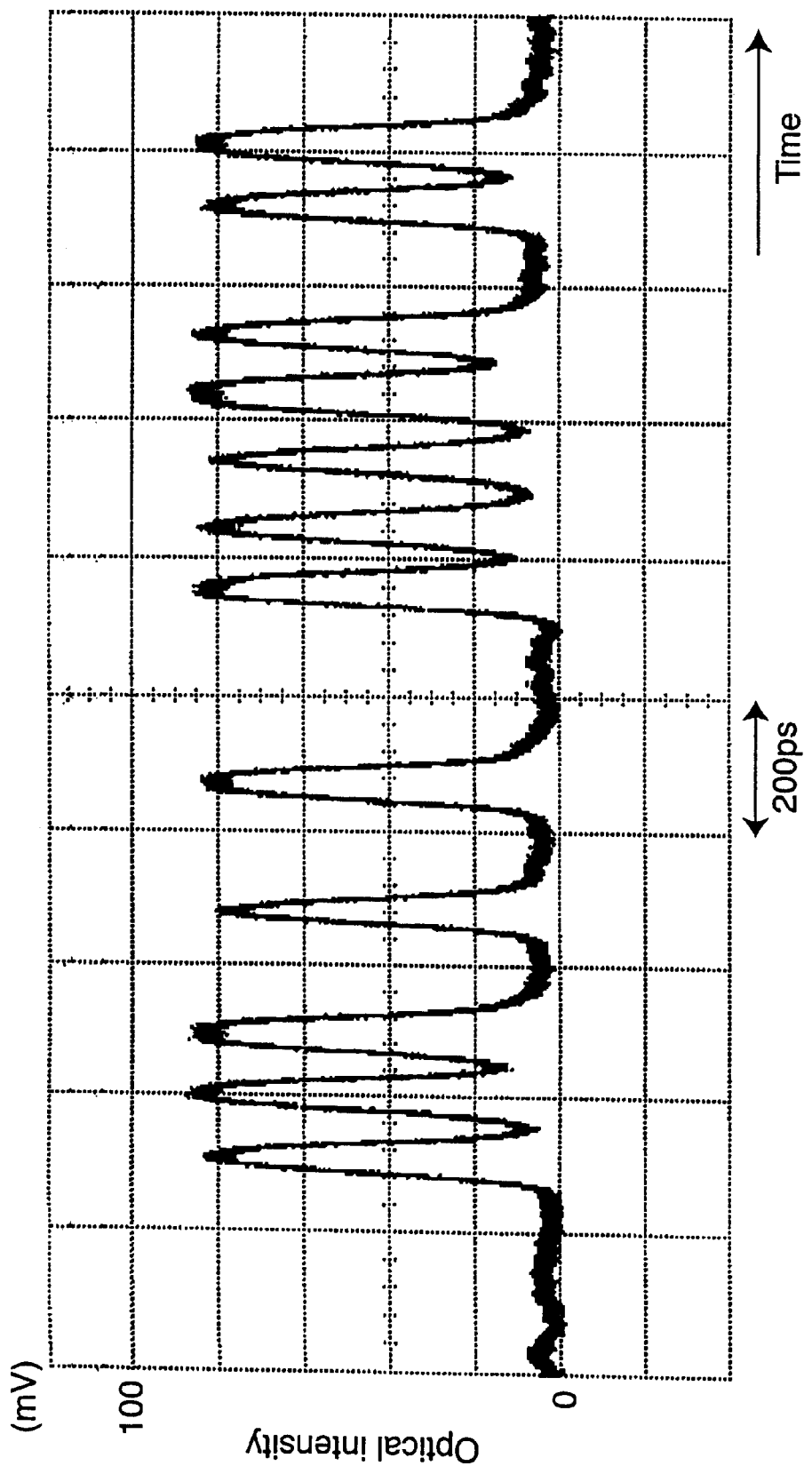
FIG. 4 shows a waveform of output light in the embodiment corresponding to the input light shown in FIG. 2.

The operation of the embodiment is confirmed using an optical pulse train in which a peak value of each optical pulse is uneven. FIG. 2 shows a waveform example of signal light input to the optical input port 10. FIG. 3 shows an optical pulse waveform of wavelength-converted light (the light of the wavelength $\lambda p$ having input port B of the optical circulator 12 from the modulator 14) by the electroabsorption optical modulator 14. FIG. 4 shows a waveform of the output light in the embodiment corresponding to the input light shown in FIG. 2. In FIGS. 2, 3, and 4, the horizontal axes and the vertical axes express time and optical intensity respectively. One graduation of the vertical axes indicates 20 mV and that of the horizontal axis indicates 200 ps. The vertical axes are illustrated in such a manner that the aimed signal light is detected by a photodetector and a certain bias voltage is added to the output of the photodetector.

While a Q value of the input signal light shown in FIG. 2 is 16 dB, the Q value of the output light becomes 19 dB. This means that the embodiment improved the Q value by 3 dB. As is obvious from FIG. 3, the extinction ratio is unsatisfactory in the wavelength conversion performed by the electroabsorption optical modulator 14 of the low bias (2 V in the embodiment). However, the extinction ratio can be improved by suppressing the low intensity parts with the saturable absorber 18, and thereby an optical pulse train having constant pulse peak value is obtained as shown in FIG. 4.

Figure 5:
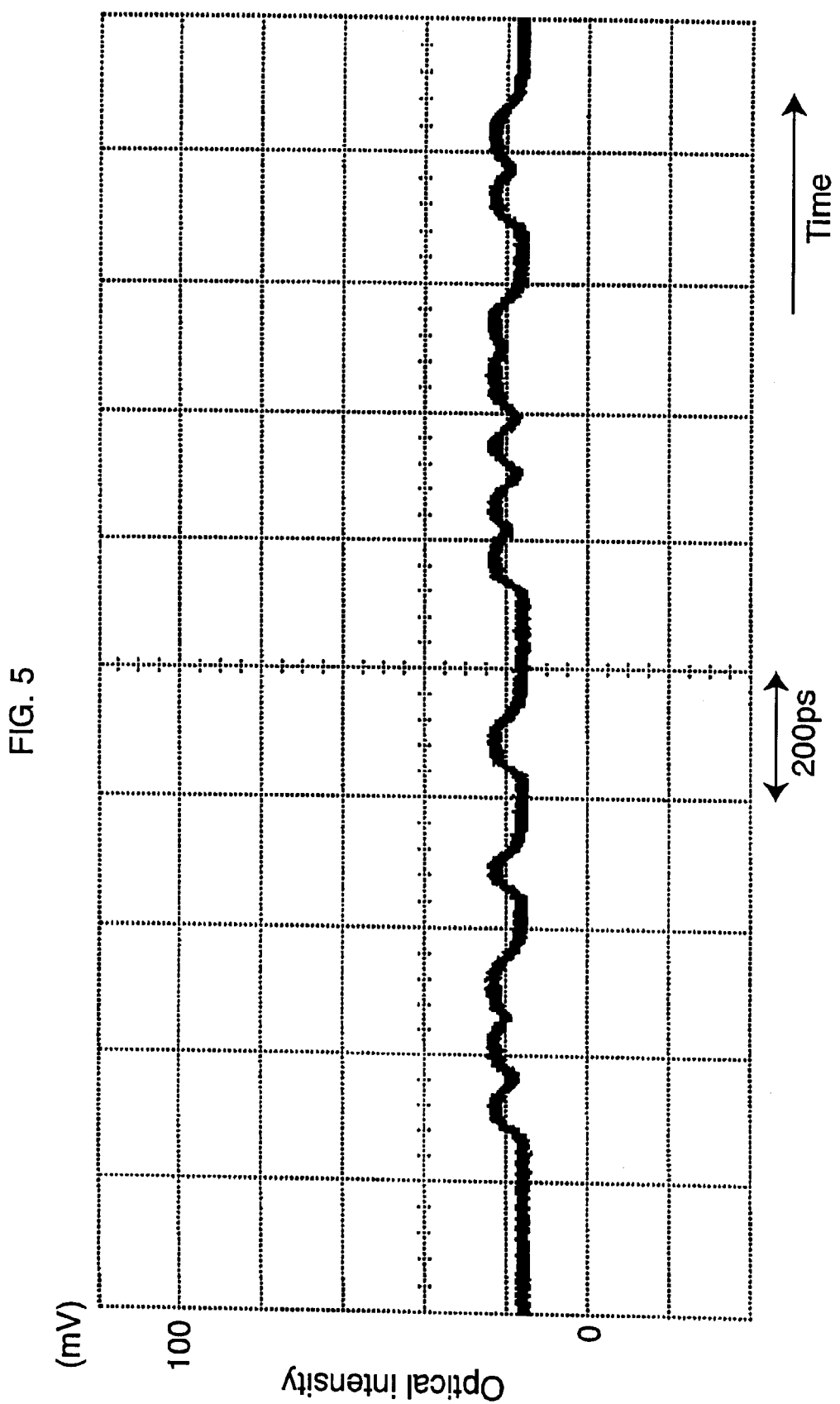
FIG. 5 shows a waveform of wavelength-converted light by the electroabsorption optical modulator 14 when a bias voltage of the electroabsorption optical modulator 14 is set to 1 volt.
Figure 6:
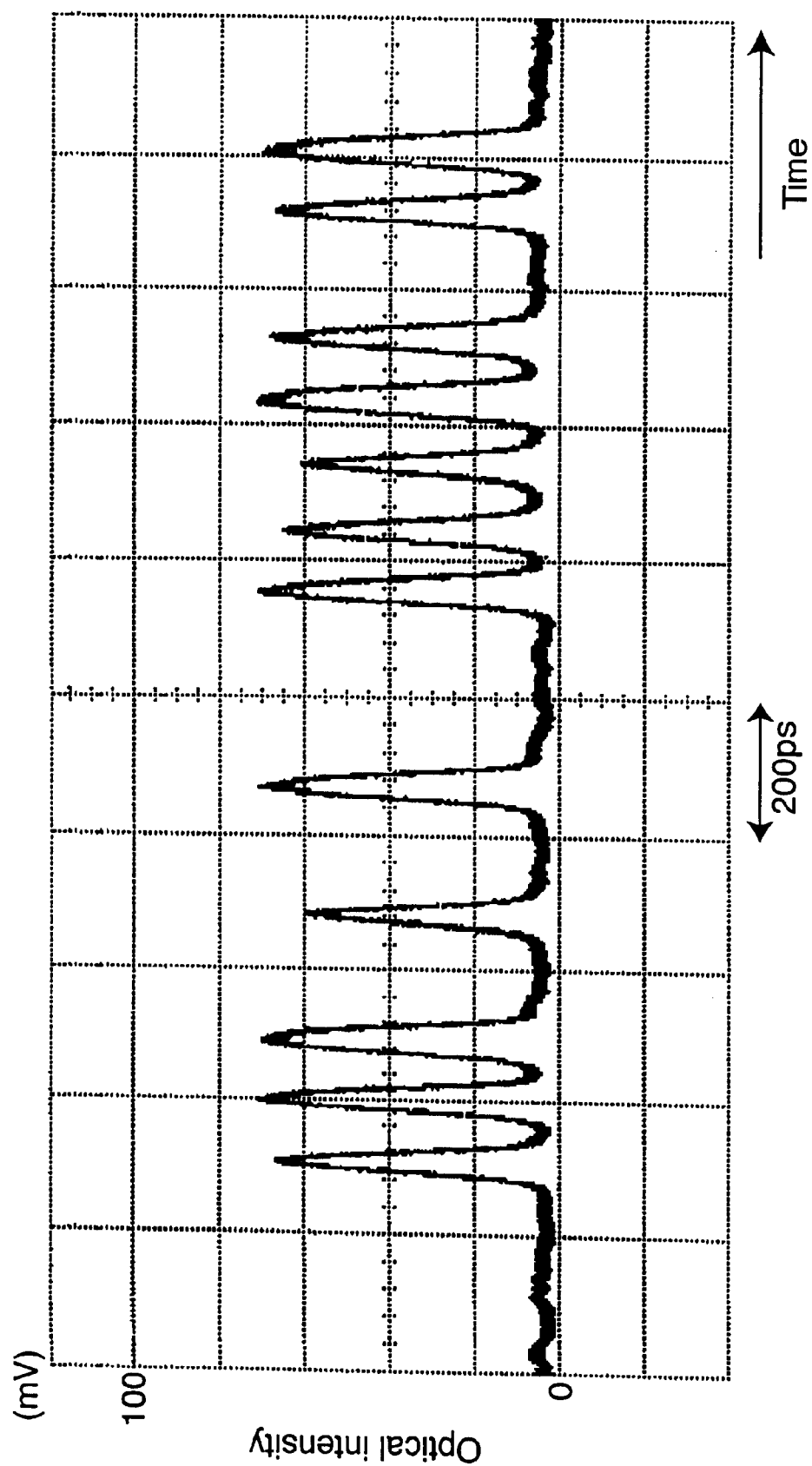
FIG. 6 shows a waveform of wavelength-converted light by the electroabsorption optical modulator 14 when the bias voltage of the electroabsorption optical modulator 14 is set to 3 volts.
Figure 7:
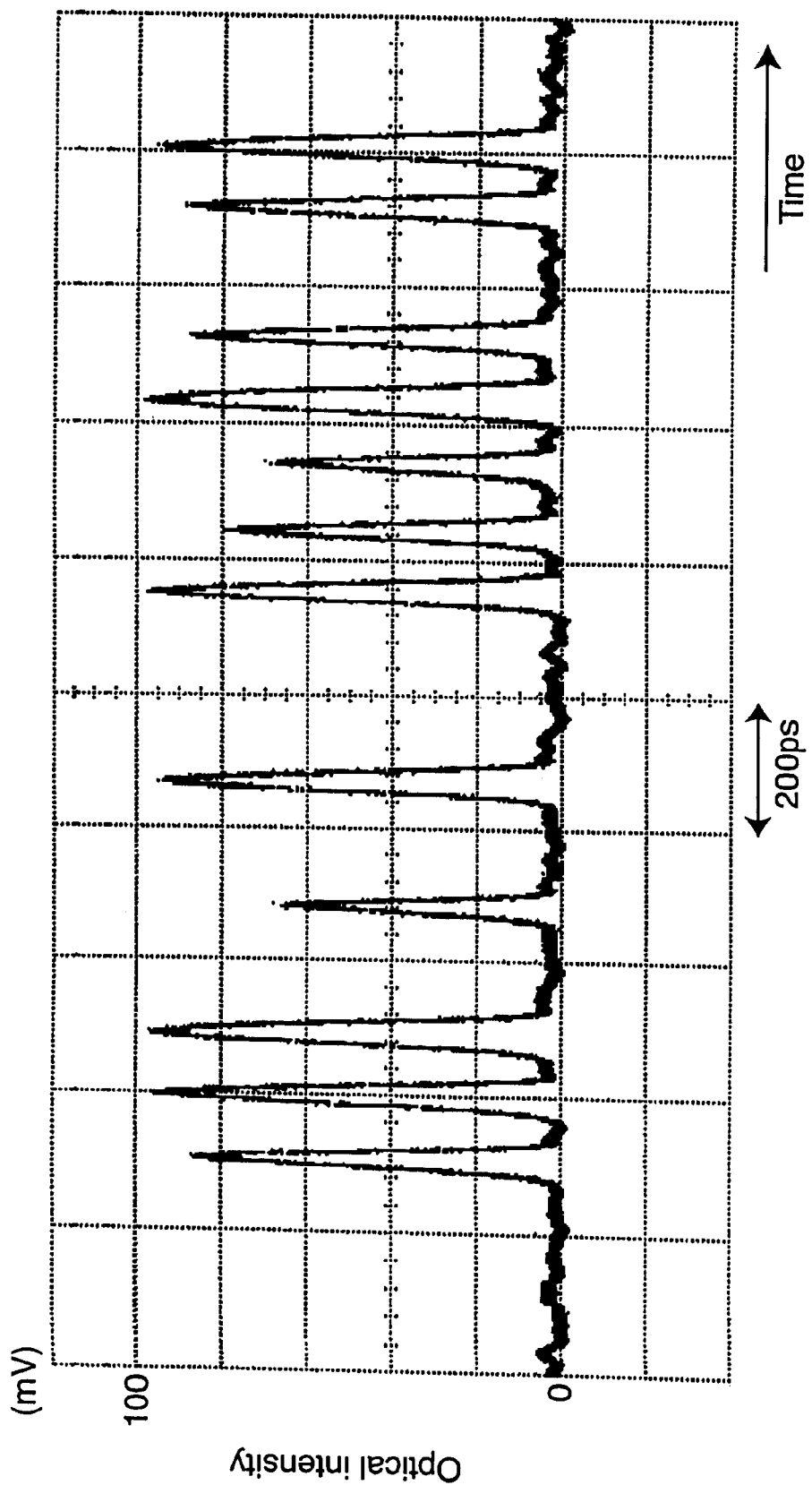
FIG. 7 shows a waveform of wavelength-converted light by the electroabsorption optical modulator 14 when the bias voltage of the electroabsorption optical modulator 14 is set to 4 volts.

For reference, waveforms of wavelength-converted light by the electroabsorption optical modulator 14 are shown in FIGS. 5, 6 and 7 when the bias voltage of the electroabsorption optical modulator 14 is set to 1 V, 3 V and 4 V respectively. In FIGS. 5, 6 and 7, the horizontal axes and the vertical axes express time and optical intensity respectively. One graduation of the vertical axes indicates 20 mV and that of the horizontal axes indicates 200 ps. The vertical axes are illustrated in such a manner that the aimed signal light is detected by a photodetector and a certain bias voltage is added to the output of the photodetector.

In the waveform shown in FIG. 5, although the peak value of each pulse is uniform, the difference between the high and low values becomes too small and so it is difficult to obtain a sufficient pulse peak even if using the saturable absorber 18. On the other hand, in the waveform shown in FIG. 6, the peak value of each optical pulse becomes irregular, and in the waveform shown in FIG. 7, the peak value becomes even more irregular. It is impossible to achieve the original goal in such conditions. Accordingly, in the embodiment, the bias voltage of the electroabsorption optical modulator 14 was adequately set to approximately 2 V. Needless to say, the suitable bias voltage is subject to change according to an element performance of an electroabsorption optical modulator used in practice.

Figure 8:
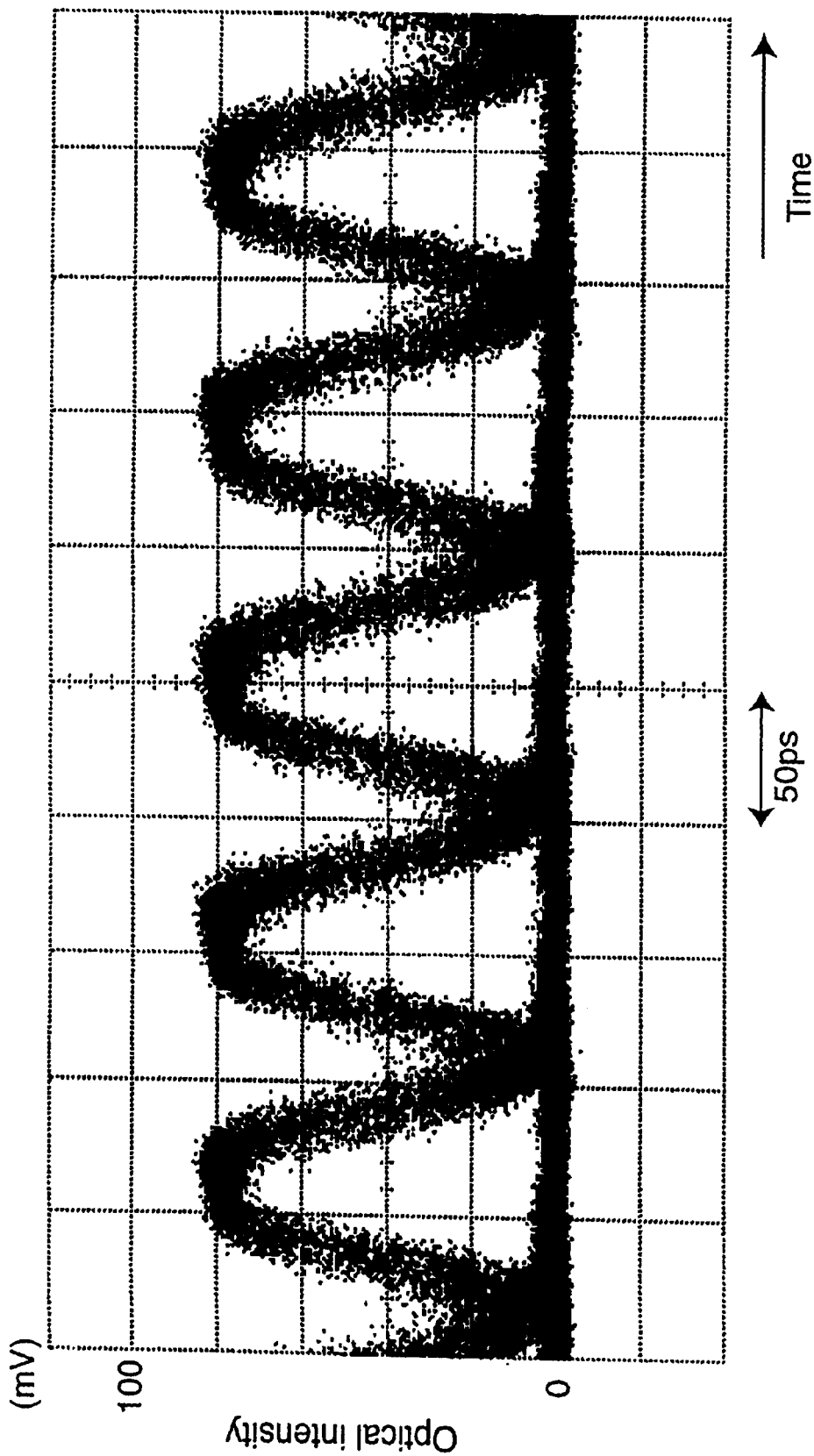
FIG. 8 shows an eye aperture pattern of the output waveform shown in FIG. 4.

FIG. 8 shows an eye aperture pattern of the output waveform shown in FIG. 4. The horizontal axis and the vertical axis express time and optical intensity respectively. One graduation of the vertical axis indicates 20 mV and that of the horizontal axis indicates 50 ps. The vertical axis is illustrated in such a manner that the aimed signal light is detected by a photodetector and a certain bias voltage is added to the output of the photodetector. As is obvious from FIG. 8, the peak part of the optical pulse is suppressed to become a constant value, and accordingly the eye aperture extends from front to back in time.

In the above embodiment, the laser light source 16 inputs CW light to the electroabsorption optical modulator 14, and the electroabsorption optical modulator 14 forms an optical pulse out of the CW light. So, the formed optical pulse waveform is similar to that of the input optical pulse. Since the waveform of the input optical pulse is generally deteriorated, the waveform of the obtained optical pulse is also deteriorated. This problem is solved by using a laser light source 16 that is composed of a pulse light source for generating pulse light synchronized with the input optical pulse.

Figure 9:
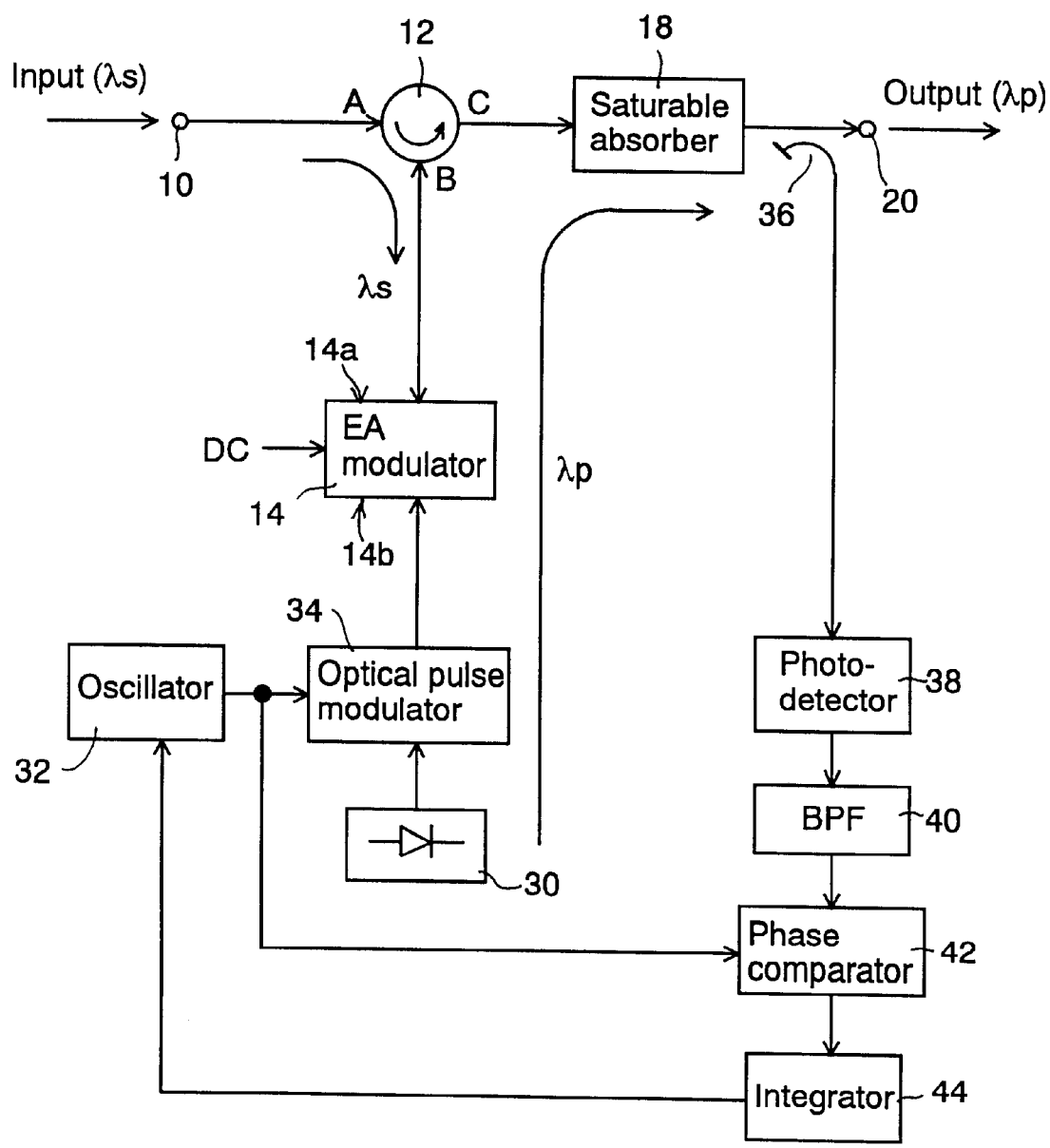
FIG. 9 shows a schematic block diagram of a modified embodiment according to the invention.
Figure 10:
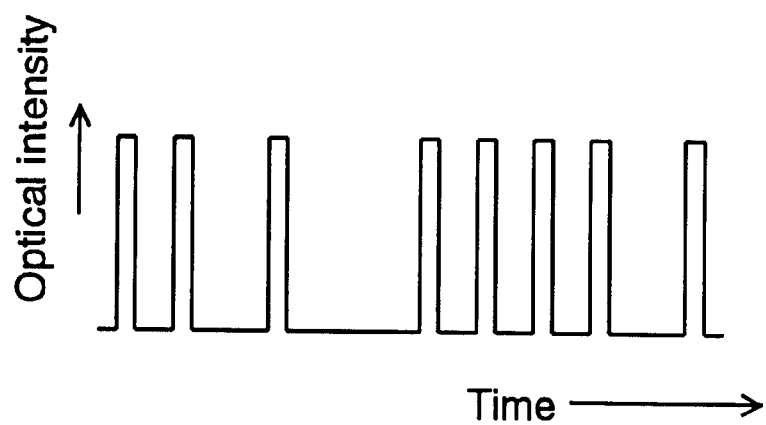
FIGS. 10(a) and 10(b) show a schematic waveform diagram explaining the pattern effect.
Figure 10:
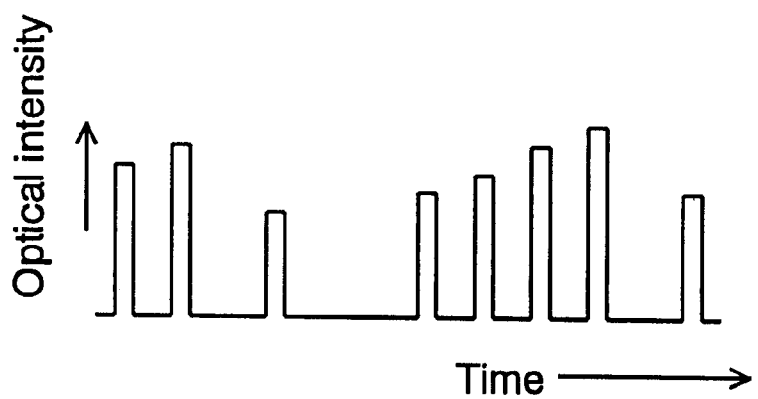

FIG. 9 shows a schematic block diagram of a modified embodiment according to the invention utilizing a pulse light source. Identical elements are labeled with reference numerals common to those in FIG. 1.

The modified part of this embodiment is explained in comparison with the embodiment shown in FIG. 1. A laser light source 30 outputs CW laser light of a wavelength $\lambda p$. An oscillator 32 is composed of a voltage-controlled oscillator, etc. and oscillates at approximately same frequency as the pulse frequency of the input light of the input port 10. An optical pulse modulator 34 modulates output light from the laser light source 30 in pulses according to the output clock from the oscillator 32 in order to form an optical pulse train having the clock frequency of the oscillator 32. The quality of the pulse waveform of the optical pulse train formed by the optical pulse modulator 34 is sufficient if it equals that of the optical pulse before the long haul transmission. The output light from the optical pulse modulator 34 is supplied to the electroabsorption optical modulator 14 through the facet 14b of the modulator 14.

The electroabsorption optical modulator 14 gates the series of optical pulses having equal peak values output from the optical pulse modulator 34 with the signal light from port B of the optical circulator 12 using the cross saturable absorbing characteristics. The optical pulse train of the wavelength λp which is applied to port B of the optical circulator 12 from the electroabsorption optical modulator 14 has the same bit pattern with that of the input signal light of the input optical port 10. Needless to say, each optical pulse has the same peak value and its pulse waveform is basically similar to that formed by the optical pulse modulator 34.

An optical coupler 36 splits the output light from the saturable absorber 18 and applies it to a photodetector 38. The photodetector 38 converts the light from the optical coupler 36 into an electric signal. A bandpass filter (BPF) 40 extracts a signal frequency component from the output of the photodetector 38. The transmission frequency band of the BPF 40 is sufficient if it roughly includes the signal frequency. A phase comparator 42 compares a phase of the output pulse from the BPF 40 with that of the output from the oscillator 32 and outputs an obtained error signal to an integrator 44. The integrator 44 smooths out the output from the phase comparator 42 with a predetermined time constant and applies it to the oscillator 32 as a phase control signal. The oscillator 32 adjusts its oscillation frequency and phase according to the phase control signal from the integrator 44.

As stated above, by utilizing pulse light as the probe light of the electroabsorption optical modulator 14, the waveform shaping function is obtained. Also, since the pulse phase of the pulse light is feedback-controlled by the output (i.e. optically limited result) of the saturable absorber 18, synchronous deviation of the electroabsorption optical modulator 14 is prevented. Consequently, it is possible to obtain output signal light of the wavelength λp in which not only each optical pulse has the same peak value but also in which each optical pulse waveform has desired and satisfactory characteristics such as steep variation in terms of time or a narrow pulse width.

Although the output light of the saturable absorber 18 is used in order to control the phase of the oscillator 32 with a PLL system, the input light of the saturable absorber 18 is also applicable.

However, when the input light is used, the PLL tends to become unstable because the input light has a low extinction rate.

As is readily understandable from the aforementioned description, according to the invention, such an optical limiter function can be realized with a simple configuration that follows a high-speed optical pulse signal and regulates a peak value of the optical pulse to be constant.

While the invention has been described with reference to a specific embodiment, it will be apparent to those skilled in the art that various changes and modifications can be made to the specific embodiment without departing from the spirit and scope of the invention as defined in the claims.

What is claimed is:

1. An optical waveform shaper comprising:
    a probe light source for generating a probe light output having a probe wavelength with a constant amplitude;
    a signal copier to accept input signal light having a signal wavelength and the probe light output from the probe light source and for copying the signal of the input signal light onto the probe light to generate a second output light having the probe wavelength; and
    an extinction ratio improver for improving an extinction ratio of the second output light having the probe wavelength from the signal copier, wherein the extinction ratio improver comprises a saturable absorber.

2. The optical waveform shaper of claim 1 wherein the signal copier comprises a waveform copier for copying a signal waveform of the input signal light onto the probe light with cross saturable absorbing characteristics.

3. The optical waveform shaper of claim 2 wherein the waveform copier comprises an electroabsorption optical modulator.

4. The optical waveform shaper of claim 1 wherein the saturable absorber comprises an electroabsorption optical modulator which is applied with a predetermined DC bias.

5. The optical waveform shaper of claim 1 further comprising an optical circulator for introducing the input signal light into the signal copier and for applying the probe light from the signal copier to the extinction ratio improver.

6. An optical waveform shaper comprising:
    a probe light source for generating a probe light with a constant amplitude;
    a signal copier to accept input signal light of a signal wavelength and the probe light from the probe light source and for copying the signal of the input signal light onto the probe light; and
    an extinction ratio improver for improving an extinction ratio of output light from the signal copier, wherein the probe light source comprises a pulse light source for generating an optical pulse having the same frequency as a clock frequency of the input signal light.

7. The optical waveform shaper of claim 6 wherein the probe light source further comprises a phase synchronizer for synchronizing the phase of the optical pulse from the pulse light source with the input signal light.

8. The optical waveform shaper of claim 7 wherein the phase synchronizer comprises a phase adjuster for adjusting the pulse phase of the pulse light source according to the output light from the extinction ratio improver.

* * * * *

UNITED STATES PATENT AND TRADEMARK OFFICE
CERTIFICATE OF CORRECTION

PATENT NO.    : 6,515,793 B2                                         Page 1 of 1
DATED         : February 4, 2003
INVENTOR(S)   : Noboru Edagawa et al.

It is certified that error appears in the above-identified patent and that said Letters Patent is hereby corrected as shown below:

<u>Title page,</u>
Item [56], References Cited, OTHER PUBLICATIONS, replace "b Nonlinear Optical Limiter and Digital Optical Switch by Cascaded Nonlinear Couplers: Analysis,?" with -- "Nonlinear Optical Limiter and Digital Optical Switch by Cascaded Nonlinear Couplers: Analysis," --

Signed and Sealed this

Ninth Day of March, 2004

JON W. DUDAS
*Acting Director of the United States Patent and Trademark Office*